May 10, 1960 B. W. GUSTAFSON Re. 24,825

RAKE TOOTH MOUNTING MEANS

Original Filed Sept. 11, 1957

INVENTOR.
B. W. GUSTAFSON

United States Patent Office

Re. 24,825
Reissued May 10, 1960

24,825

RAKE TOOTH MOUNTING MEANS

Blaine W. Gustafson, Ottumwa, Iowa, assignor, by mesne assignments, to Deere & Company, a corporation of Delaware Original No. 2,909,889, dated October 27, 1959, Serial No. 683,303, September 11, 1957. Application for reissue January 4, 1960, Serial No. 457

13 Claims. (Cl. 56—400)

Matter enclosed in heavy brackets [ ] appears in the original patent but forms no part of this reissue specification; matter printed in italics indicates the additions made by reissue.

This invention relates to a rake tooth means particularly for a side-delivery rake or equivalent implement.

The general object of the invention is to provide an improved rake tooth means and mounting therefor. More particularly, the invention features the utilization of mounting means including a block of rubber or similar elastomer material wtih mounting means at one end and a rake tooth projecting from the other end. The invention further features two forms of design, in one of which the rubber block is operative primarily in bending when subjected to normal loads and in the other of which the block is placed in shear when subjected to normal loads. The advantage of the rubber block is that it will not take a permanent set, because of extreme or abnormal conditions, such as when the tooth is abnormally deflected laterally, as by jumping over the adjacent stripper bar. It is a specific object of the invention to improve the mounting means by providing the rubber block in the form of a pocketed end having opposite arms or furcations between which the rake bar is received, the furcations being apertured to receive securing means passing through the bar. A further object is to provide the pocket with a metallic or equivalent liner bonded or otherwise secured to the block at the portions thereof that define the cavity. A still further feature of the invention resides in the provision of a stud secured to the liner and projecting into and embedded in the block, thereby improving the connection between the liner and the block.

The foregoing and other advantages and features inherent in and encompassed by the invention will become apparent as preferred embodiments thereof are disclosed in detail in the ensuing specification and accompanying sheet of drawings, the several figures of which are described immediately below.

Figure 1:
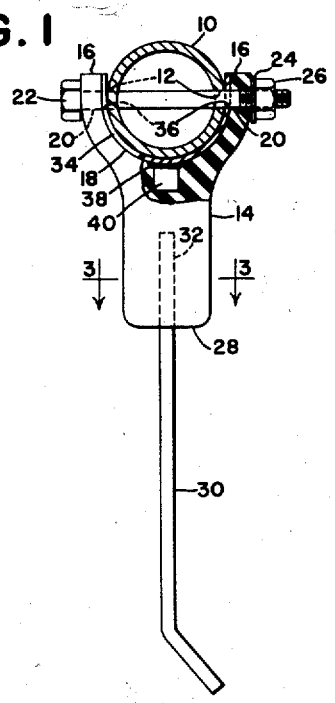
Fig. 1 is an end view, with parts broken away and partly in section, of a rake bar and the improved rake tooth mounting means.
Figure 2:
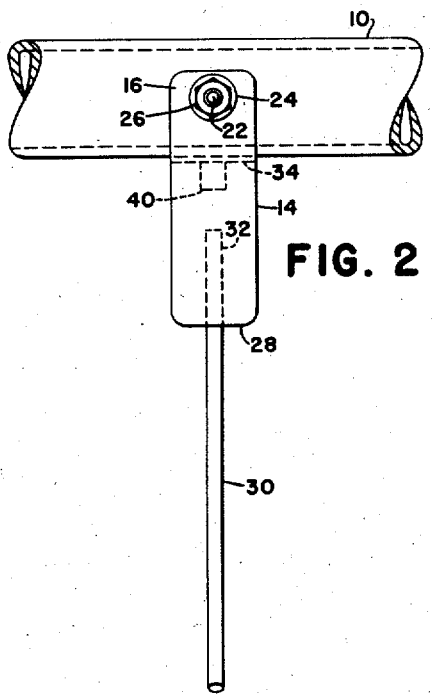
Fig. 2 is an elevation of same, partly in section.

Figs. 1 and 2 illustrate at 10 a tubular rake bar of cylindrical section. Bars of this character are conventionally used in side-delivery rakes and although a cylindrical tubular bar is illustrated, other types of bars may be used with the improved mounting. In the particular instance, the bar has a pair of diametrically alined apertures 12 which are used to mount conventional rake teeth, such as the well-known coil spring type. It is a feature of the present invention to adapt the improved rake mounting for mounting on a conventional rake bar so that the existing mounting apertures may be used. The apertures 12 represent the normal or ordinary mounting apertures in the bar.

The rake tooth mounting means includes a block 14 of rubber or equivalent elastomer material, one end of which is bifurcated to afford a pair of arms or furcations 16. These furcations and the accompanying shape of the block afford a pocket 18 in the block which conforms to and is adapted to receive the rake bar 10, the furcations 16 extending at diametrically opposite sides of the bar. The furcations are apertured at 20 in alinement with the bar apertures 12 and securing means in the form of a bolt 22 is passed through the registered apertures and receives a washer 24 and nut 26 at its opposite end. With the block thus mounted, it will be noted that the block extends radially from the rake bar to a free or terminal end 28 from which a rake tooth 30 projects. The rake tooth may be of conventional rake tooth stock, such as spring steel, and one end thereof, as at 32, is embedded in and secured to the block as by being bonded thereto, a result which occurs when the block is molded about the rake tooth. The free end of the rake tooth projects from the block and performs its normal function in raking hay or handling other material, depending upon the environment in which the structure is used.

The mounting means features the use of a liner element 34, here a metallic member shaped to conform to the pocket 18; although, the member may be of any material other than that of which the block 14 is constructed. The liner, as stated, is shaped to conform to the pocket 18 and follows the furcations or arms 16, being itself diametrically apertured at 36 in alinement with the furcation apertures 30, so that the bolt 22 passes through the liner apertures 36. The liner is adhered to the block, as by being bonded or otherwise secured thereto in the portion of the block that affords the pocket or cavity 18. The shape of the pocket and liner is such as to closely receive the bar 10 and this relationship, plus the mounting at 22, rigidly secures the block to the bar against twisting and other undesirable movement, leaving the block 14 as the means for absorbing shock etc. imposed on the rake tooth. As a further adjunct to the mounting means, there is rigidly secured to the liner 34, as by welding at 38, a stud or projecting portion 40 which enters and is embedded in the block 14, preferably coaxially with the embedded end 32 of the rake tooth 30.

In this form of the invention, where the stud 40 and rake tooth 30 are coaxial, the block 14 is placed primarily in bending during normal operation of the structure in which the rake tooth mounting means is used. That is to say, forces laterally of the rake tooth 30 place the block in bending between the terminal end of the stud 40 and the terminal end of the rake tooth portion 32. The amount of resiliency can be controlled by varying the axial distance between these two parts.

Figure 4:
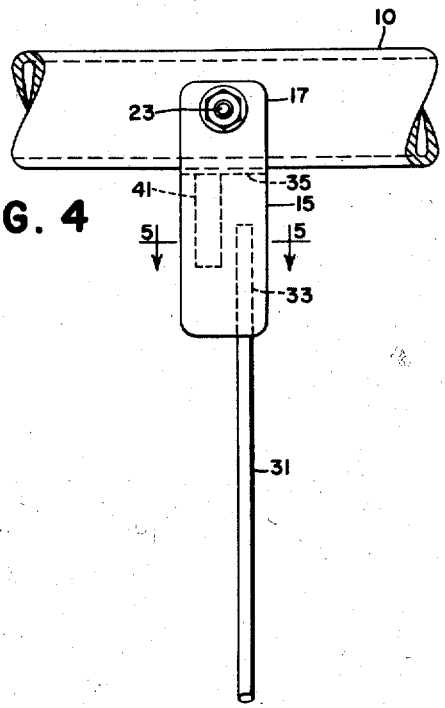
Fig. 4 is a view similar to Fig. 2 but showing a modified form of the invention.
Figure 3:
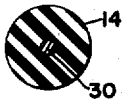
Fig. 3 is a section on the line 3—3 of Fig. 1.
Figure 5:
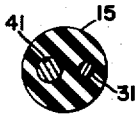
Fig. 5 is a section on the line 5—5 of Fig. 4.

Fig. 4 shows a modified form of construction involving the rake bar 10 and a mounting block 15 having furcations 17 secured to the bar 10 by a bolt and nut assembly 23. This mounting means includes a liner 35, and to this extent the structure is identical with that described in connection with Figs. 1, 2 and 3. The difference is that the projecting stud, shown at 41, is laterally offset from the embedded end 33 of a rake tooth 31, thus placing the block 15 in shear when the rake tooth is subjected to normal loads. Here, as in the case of the structure of Figs. 1, 2 and 3, the block is placed in compression when the rake tooth is subjected to column loads. Other than that, the structures are identical and although the structure in Figs. 4 and 5 has been only briefly described relative to the relationship of the furcations 17 to the bar 10, it will be understood that the fundamental details involved in Figs. 1, 2 and 3 are present.

Both forms of the invention provide improved rake tooth mounting means which may be readily substituted in the field for the conventional coil spring types. Each mounting means is simply constructed, economical to manufacture and may be readily replaced when worn out or destroyed. Features and advantages other than those enumerated will readily occur to those versed in the art, as will modifications and alterations in the structures disclosed, all of which will readily occur without departure from the spirit and scope of the invention.

What is claimed is:

1. Rake tooth means for mounting on a rake bar, comprising: a mounting block of elastomer material having a pair of furcations projecting from one end thereof, said furcations providing a concave pocket adapted to receive the rake bar with the furcations at diametrically opposite sides of the bar, said furcations being apertured in alinement; securing means passed through the apertured furcations and engaging the bar; and a rake tooth secured to the block and projecting therefrom.

2. The invention defined in claim 1, includnig: a liner element lining the concave pocket so as to be interposed between the bar and the block.

3. The invention defined in claim 2, in which: the liner element is metallic and is adhered to the block.

4. The invention defined in claim 3, including: a stud rigidly secured to the liner element and projecting into and embedded in the block.

5. The invention defined in claim 4, in which: the rake tooth is embedded at one end in the block coaxially with the stud and said tooth projects from the end of the block opposite the furcations.

6. The invention defined in claim 4, in which: the rake tooth is embedded at one end in the block in laterally offset and side-by-side overlapping relation to the stud and said tooth projects from the end of the block opposite the furcations.

7. Rake tooth means for mounting on a rake bar, comprising: a mounting block of elastomer material having a pair of furcations projecting from one end thereof, said furcations providing a concave pocket adapted to receive the rake bar with the furcations at diametrically opposite sides of the bar, said furcations being apertured in alinement; a metallic liner element shaped to conform to the pocket and received therein and adhered to the block so as to be interposed between the block and bar, said element being apertured respectively in register with the apertured furcations; securing means passed through the apertured furcations and apertured liner and engaging the bar; and a rake tooth secured to the block and projecting therefrom.

8. The invention defined in claim 7, including: means on the liner element and projecting into the block to improve the connection between the block and said element.

*9. Rake tooth means for mounting on a rake bar, comprising: a mounting block of elastomer material having a first end proximate to the bar and a second end spaced from the bar in a direction normal to the length of the bar, said first end having a concavity thereon generally conforming to the proximate portion of the bar; a rake tine of relatively rigid material other than that of the block and secured to the block and projecting from the second end of the block substantially as an extension thereof; and U-shaped means at said first end of the block and including a bight connected to said first end and a pair of legs projecting beyond said end at opposite sides of the cavity so as to straddle the rake bar, said legs being apertured in alinement on a line transverse to the bar for receiving fastener means to secure said U-shaped means to the bar.*

*10. The invention defined in claim 9, in which: the U-shaped means includes a member of relatively rigid material other than that of the block and having portions providing the legs and a portion providing the aforesaid bight, and said bight portion and the block have interlocking portions at least in part effectuating the securement of the block to said member.*

*11. The invention defined in claim 10, in which: said first end of the block has side portions extended at least in part along the legs to afford increased areas of contact between said member and the block.*

*12. Rake tooth means for mounting on a rake bar, comprising: a mounting block of elastomer material having a first end proximate to the bar and a second end spaced from the bar in a direction normal to the length of the bar; a rake tine of relatively rigid material other than that of the block and secured to the block and projecting from the second end of the block substantially as an extension thereof; and U-shaped means at said first end of the block and including a bight connected to said first end and affording a pocket to receive the proximate portion of the rake bar and a pair of legs projecting beyond said bight to straddle the rake bar, said legs being apertured in alinement on a line transverse to the bar for receiving fastener means to secure said U-shaped means to the bar.*

*13. The invention defined in claim 12, in which: rake tine is secured to said block by having one end thereof embedded in said block, and the bight of the U includes a rigid element of material other than that of the block and disposed transversely to the axis of the rake tine and spaced from said embedded end of the rake tooth lengthwise of the axis of said tine.*

References Cited in the file of this patent or the original patent

UNITED STATES PATENTS

| | | |
|---|---|---|
| 227,604 | Witter | May 11, 1880 |
| 1,780,748 | Fisher | Nov. 4, 1930 |
| 2,328,121 | Bartek | Aug. 31, 1943 |
| 2,499,030 | Moon | Feb. 28, 1950 |
| 2,514,560 | Scranton | July 11, 1950 |
| 2,805,058 | Grant | Sept. 3, 1957 |

FOREIGN PATENTS

| | | |
|---|---|---|
| 379,808 | Great Britain | Sept. 8, 1932 |